(12) United States Patent  
Sosa et al.

(10) Patent No.: US 8,830,913 B1
(45) Date of Patent: Sep. 9, 2014

(54) LOCATION-BASED SOFTWARE UPDATES

(71) Applicant: Google Inc., Mountain View, CA (US)

(72) Inventors: Chris Sosa, Sunnyvale, CA (US); Paul Allan Covell, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/079,566

(22) Filed: Nov. 13, 2013

(51) Int. Cl.
*H04W 4/00* (2009.01)
*G06F 9/445* (2006.01)
*H04M 3/00* (2006.01)
*H04W 24/02* (2009.01)

(52) U.S. Cl.
CPC . *G06F 8/65* (2013.01); *H04W 24/02* (2013.01)
USPC .......................................... 370/328; 455/418

(58) Field of Classification Search
None
See application file for complete search history.

(56) References Cited

U.S. PATENT DOCUMENTS

2001/0011019 A1* 8/2001 Jokimies ....................... 455/449
2001/0029178 A1* 10/2001 Criss et al. ................... 455/419
2007/0021116 A1* 1/2007 Okita et al. ................... 455/428
2008/0233943 A1* 9/2008 Okita et al. ................... 455/419
2009/0080381 A1* 3/2009 Yashar et al. ................. 370/331
2009/0233609 A1* 9/2009 Iun et al. ...................... 455/445
2009/0245176 A1* 10/2009 Balasubramanian et al. 370/328

* cited by examiner

*Primary Examiner* — Eunsook Choi
(74) *Attorney, Agent, or Firm* — McDermott Will & Emery LLP (57) ABSTRACT

Techniques for determining appropriate locations to update mobile device software to prevent initiation of unwanted software updates are provided. An example method includes identifying one or more wireless access points within wireless connection range of a mobile device, determining whether a wireless access point of the one or more identified wireless access points is included in a list of preferred wireless access points, the list generated with consideration to previous software updates performed via the preferred wireless access points and durations of network connectivity during the previous software updates, scheduling one or more software updates using the wireless access point, when the wireless access point is included in the list of preferred wireless access points, and performing the scheduled software updates upon connection to the wireless access point.

19 Claims, 6 Drawing Sheets

LOCATION-BASED SOFTWARE UPDATES

FIELD

The present disclosure relates generally to mobile software applications and particularly to updating such applications.

BACKGROUND

The complexity of mobile devices and software required to operate them is increasing. Additionally, software updates for such devices tend to be large and, if made over a paid and tiered mobile data service plan, may consume a significant portion of the bandwidth allowed to a device for a single month. Some providers of updates recommend that the updates be made when the mobile device is connected to a local area network (e.g., a broadband WiFi network) instead of through the corresponding mobile connection tied to a data service plan. Some mobile devices warn users before attempting to download and/or perform a software update. However, these warnings may go unnoticed or may be ignored by the user, potentially costing the user. Moreover, large updates may take a long time to complete, especially when performed over slower mobile data service connections, and interfere with other network activities initiated by a user, such as web browsing.

SUMMARY

The disclosed subject matter relates to determining appropriate locations to update mobile device software to prevent initiation of unwanted software updates.

An example method includes identifying one or more wireless access points within wireless connection range of a mobile device, determining whether a wireless access point of the one or more identified wireless access points is included in a list of preferred wireless access points, the list generated with consideration to previous software updates performed via the preferred wireless access points and durations of network connectivity during the previous software updates, scheduling one or more software updates using the wireless access point, when the wireless access point is included in the list of preferred wireless access points, and performing the scheduled software updates upon connection to the wireless access point.

Another example method includes determining a pattern of connection activity for one or more wireless access points, where the determined pattern is based on connectivity information, assigning scores to respective wireless access points in the determined pattern, the scores based on the connectivity information, comparing the assigned scores to a threshold score, and determining a wireless access point to be a preferred wireless access point when an assigned score of the wireless access point is greater than the threshold score.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Aspects of the subject technology provide software that, when installed on a mobile device, determines appropriate locations to update the mobile device so as to prevent the initiation of unwanted software updates. The mobile device can be configured to record location information associated with a wireless (e.g., WiFi) access point of a local area network whenever the mobile device is connected to the wireless access point. Location information may include a geo-coordinate location of the mobile device received from a mobile device integrated GPS unit at the time the mobile device is connected to the wireless access point and may thus represent a geo-coordinate location of the wireless access point and its network. In addition to the location information, the mobile device can be configured to record an Internet protocol (IP) address or service set identifier (SSID) associated with the wireless access point, and the like. The mobile device may also record software update information that can include information on when software updates and large downloads (e.g., over 50 Mb) are performed using the wireless access point, and how long the mobile device is connected to the wireless access point. Aspects of the subject technology may provide the user with an option to opt-out of features, including, but not limited to, determining a geo-coordinate received from an integrated GPS unit within the mobile device.

In aspects of the subject technology, the mobile device determines a pattern of connection activity based on various factors, including an identification of the wireless access point, the date or time of the day on which a connection to the access point takes place, the time spent connected to the access point, whether connections to the same access point are periodically made, and the like. Each wireless access point may be categorized or scored based on these factors, and then the access points having the top scores designated as preferred access points. As a non-limiting example, the determined pattern may be stored as a data structure in memory. The data structure may include access point identifiers identifying one or more access points to which connections from the mobile device take place, scores associated with each access point and an identification of whether an access point is a preferred access point. An access point identifier may point to (or address) the same or another data structure in the memory that stores, for example, values representing a date or time of the day on which connections to the access point may take place, the time spent connected to the access point, whether connections to the same access point are periodically made, and the like. In this way, the mobile device then automatically determines one or more preferred access points based on the pattern of activity. Each wireless (e.g., WiFi) access point may further be uniquely identified, for example, by its coordinate location (e.g., GPS coordinates) appended to an associated identification (e.g., SSID).

When the mobile device connects to a wireless access point, the mobile device determines whether the currently connected access point is a preferred access point. If the currently connected wireless access point is a preferred access point then the mobile device allows software updates using the currently connected wireless access point. Otherwise, the mobile device automatically proscribes software updates using the currently connected wireless access point.

In some implementations, the pattern of activity, including the previously described location information may be used to determine that a preferred wireless access point is nearby, or to anticipate that a mobile device will enter vicinity of the preferred wireless access point within a predetermined time period. The predetermined time period may be a few seconds, minutes or any other time period. Accordingly, if an update is available for the mobile device, the mobile device may display an indication that the device will perform the update on connecting to the preferred wireless access point.

In this way, because aspects of the subject technology determine appropriate locations (e.g., preferred access points) having WiFi access to update mobile device software, unwanted updates that may be performed over a mobile connection tied to a data plan are avoided. This saves a user mobile data plan bandwidth and can also be cost effective for the user. Furthermore, large software updates may typically take less time when performed over a WiFi connection and interfere less with other network activities initiated by a user, such as web browsing.

Figure 1:
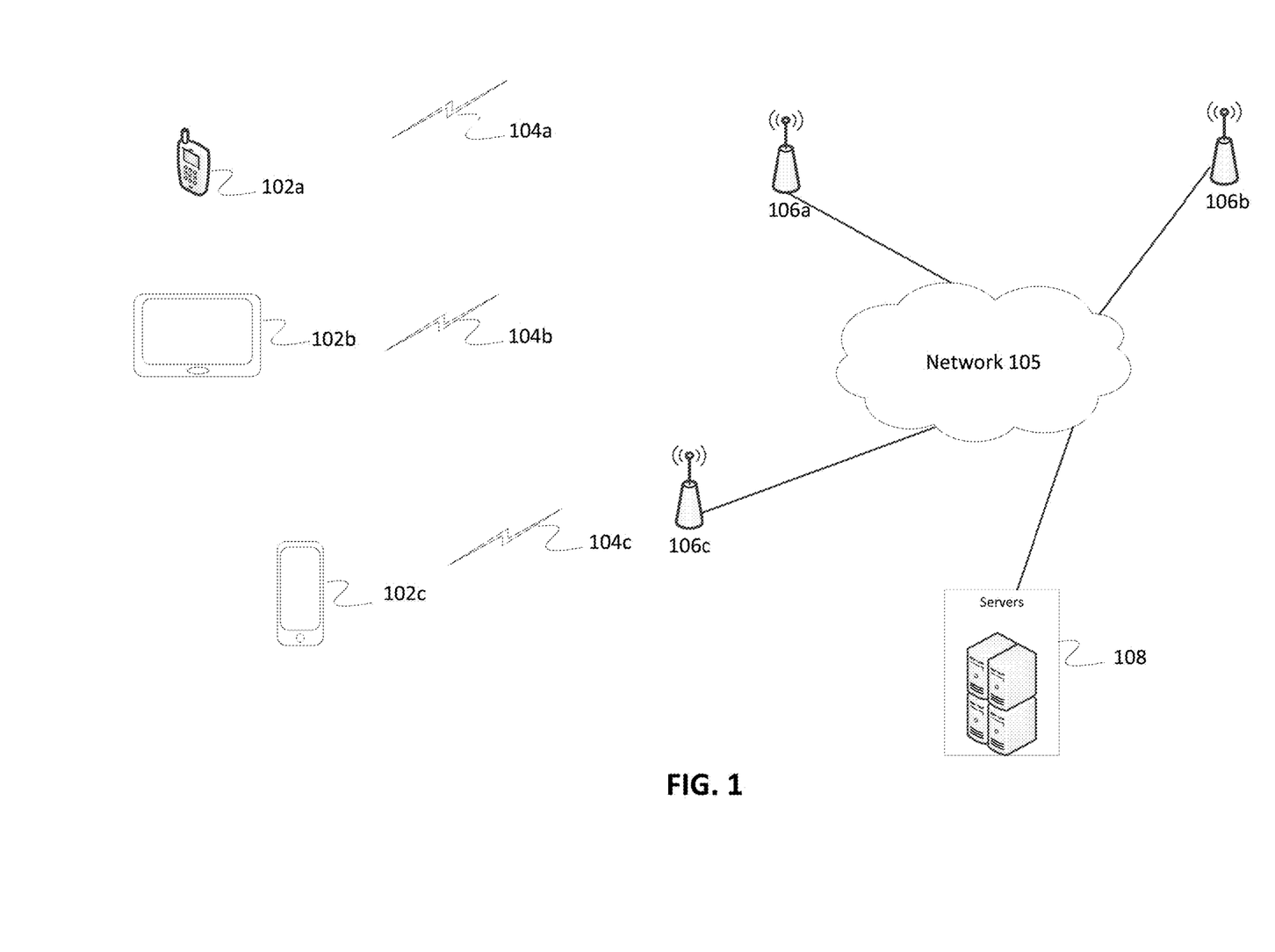
FIG. 1 is a diagram of an example network environment suitable for practicing an implementation of the subject technology.

FIG. 1 illustrates an example environment which can provide for connecting to a network. Communication environment 100 may include computing devices 102a, 102b and 102c (hereinafter "102a-c"), which may communicate with access points 106a, 106b and 106c (hereinafter "106a-c") over wireless communication channels 104a, 104b and 104c (hereinafter "104a-c"). Channels 104a-c may comprise bi-directional communication links. Channels 104a-c may include WiFi communication links.

Each of computing devices 102a-c can represent various forms of processing devices. Example processing devices can include a mobile device, cell phone, tablet computer, smart watch, desktop computer, a laptop computer, a handheld computer, a personal digital assistant (PDA), a cellular telephone, a network appliance, a camera, a smart phone, a television, an enhanced general packet radio service (EGPRS) mobile phone, a media player, a navigation device, an email device, a game console, or a combination of any these data devices or other devices that may receive and/or transmit information wirelessly. In example aspects, computing devices 102a-c may also include access points.

In some aspects of the subject technology, computing devices 102a-c and access points 106a-c may communicate in accordance with one or more communication standards, such as one of the IEEE 802.11(a), (b) or (g) standards (or WiFi standards), the Digital Video Broadcasting Terrestrial (DVB-T) broadcasting standard, and/or the High performance radio Local Area Network (HiperLAN) standard. In other aspects of the subject technology, computing devices 102a-c may communicate with one or more of access points 106a-c using a multi-carrier transmission technique, such as an orthogonal frequency division multiplexing (OFDM) technique that uses orthogonal subcarriers to transmit information within an assigned spectrum. Other wireless local area network (LAN) and wireless wide area network (WAN) communication techniques may also be suitable for communications between devices 102a-c and access points 106a-c. Examples of the subject disclosure are applicable to access points which may perform neighborhood discovery, radar detection, and channel-width selection (e.g., per revisions of some IEEE 802.11 standards), among other things.

Servers 108 can be any devices having a processor, memory, and communications capability. Servers 108 may be configured to provide software updates to devices 102a-c in accordance with aspects of the disclosure. For example, servers 108 can provide software updates to device 102a when device 102a is connected to a preferred wireless access point (e.g., access point 106c).

In addition to facilitating communications between computing devices 102a-c, in some aspects of the subject technology, access points 106a-c may be coupled with network 105, such as an intranet or the Internet, allowing computing devices 102a-c to access such networks. Network 105 can include, for example, any one or more of a personal area network (PAN), a local area network (LAN), a campus area network (CAN), a metropolitan area network (MAN), a wide area network (WAN), a broadband network (BBN), the Internet, and the like. Further, network 150 can include, but is not limited to, any one or more of the following network topologies, including a bus network, a star network, a ring network, a mesh network, a star-bus network, tree or hierarchical network, and the like. Although FIG. 1 illustrates point-to-point communications (e.g., where an access point synchronizes with a network), aspects of the subject technology may also be suitable to point-to-multipoint communications (e.g., peer-to-peer communications in which communication units may share the responsibility for synchronizing with a network).

As discussed above, aspects of the subject technology provide software that, when installed on a mobile device, determines appropriate locations to update the mobile device so as to prevent the initiation of unwanted software updates. Referring to FIG. 1, devices 102a-c can be configured to record location information whenever they are connected to any of wireless access points 106a-c. Location information may include a geo-coordinate location of the mobile device received from a mobile device integrated GPS unit at the time the mobile device is connected to the wireless access point and can thus represent a geo-coordinate location of the wireless access point and its network. In addition to the location information the mobile device can be configured to record an Internet protocol (IP) address or service set identifier (SSID) associated with the wireless access point, and the like. The mobile device may also record software update information that include information on when software updates and large downloads (e.g., over 50 Mb) are initiated using the wireless access point (e.g., access point 106a), and how long the mobile device is connected to the wireless access point.

It is to be appreciated that the aspects of the subject technology discussed herein are not limited to devices 102a-b, access points 106a-c and channels 104a-c illustrated in FIG. 1 and can operate with any number of devices, access points and channels. While the following is discussed with respect to WiFi access points, it is to be is to be appreciated that the aspects of the subject technology discussed herein are not limited to WiFi access points and can operate with any other form of wireless and broadband access points.

Figure 2:
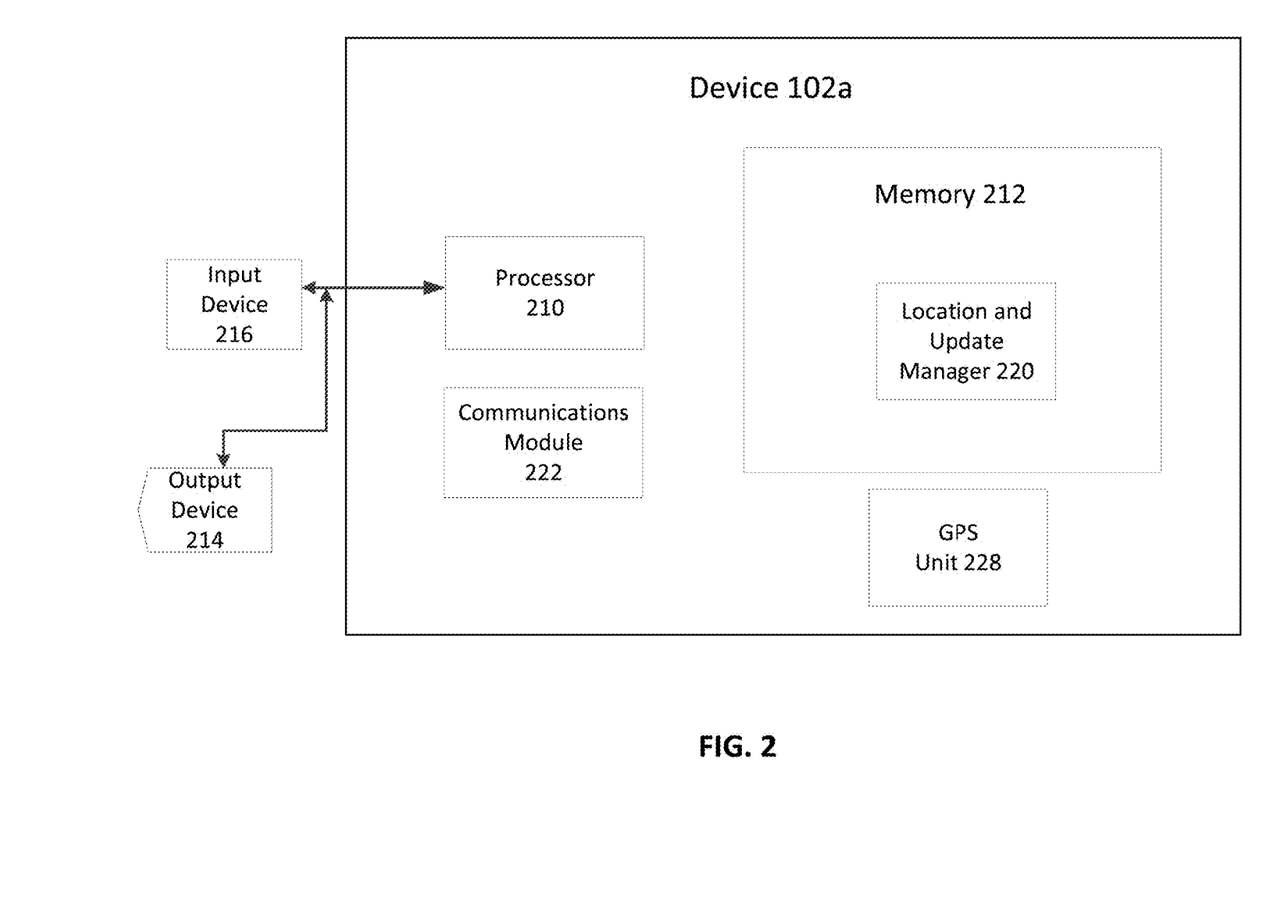
FIG. 2 is a block diagram illustrating an example device from the environment of FIG. 1 according to an aspect of the disclosure.

FIG. 2 illustrates a diagram of device 102a in greater detail, according to aspects of the subject technology. Referring to FIG. 2, device 102a includes processor 210, memory 212, communication module 222 and GPS unit 228. In aspects of the subject technology, memory 212 includes location and update manager 220. Output device 214 can include a touch screen graphic display or non-touch screen graphic display of device 102a. Input device 216, can be any input device, such as a keyboard, touchscreen, or mouse, to receive user input. While the following is discussed with respect to device 102a, it is to be appreciated that the present aspects of the subject technology can work with device 102b and any other mobile and computing device.

In aspects of the subject technology, the processor 210 of the device 102a is configured to execute instructions, such as instructions physically coded into the processor 210 and software instructions (e.g., instructions from location and update manager 220) read from memory 212. For example, the processor 210 of the device 102a executes instructions from location and update manager 220 to determine one or more preferred access points based on location information, software update information and a time period for a connection to one or more access points. As discussed above, location information may include a geo-coordinate location of the mobile device received from a mobile device integrated GPS unit (e.g., GPS unit 228) at the time the mobile device is connected to the wireless access point and may thus represent a geo-coordinate location of the wireless access point and its network. In addition to the location information, the mobile device can be configured to record an Internet protocol (IP) address or service set identifier (SSID) associated with the wireless access point, and the like. The mobile device may also record software update information that can include information on when software updates and large downloads (e.g., over 50 Mb) are performed using the wireless access point, and how long the mobile device is connected to the wireless access point.

In aspects of the subject technology, location information and software update information for device 102a can be received by location and update manager 220 when device 102a is connected to any of access points 106a-c. In an aspect, location and update manager 220 may store the received location and the software update information in memory 212. The location and update information may be stored by location and update manager 220 in memory 212 as any data structure, including, but not limited to, one or more data tables. In an aspect, location and update manager 220 may store location information in a location information table in memory 212. In an aspect, location and update manager 220 may store software update information in a software information table in memory 212. The location information in the location information table may point to (or address) respective software update information in the software information table. This example is illustrative and is not intended to limit the embodiments. In an aspect, such stored location and software update information may be read by location and update manager 220 from memory 212 of device 102a. In another aspect, such location information and software update information for device 102a can be received by location and update manager 220 from servers 108 where it may be previously stored for device 102a.

Access points 106a-c can be, for example, WiFi access points. In aspects of the subject technology, location and update manager 220 is configured to record location and software update information in memory 212 whenever device 102a is connected to a wireless access point (e.g., access point 106a) associated with a network. Location information may include a geo-coordinate location of the mobile device received from a mobile device integrated GPS unit at the time the mobile device is connected to the wireless access point and may thus represent a geo-coordinate location of the wireless access point and its network. In addition to the location information, the mobile device can be configured to record an Internet protocol (IP) address or service set identifier (SSID) associated with the wireless access point, and the like. The mobile device may also record software update information that can include information on when software updates and large downloads (e.g., over 50 Mb) are performed using the wireless access point, and how long the mobile device is connected to the wireless access point. Location and update manager 220 can determine one or more preferred access points based on the location information, the software update information and a time period for a connection to the one or more access points.

In some aspects of the subject technology, location and update manager 220 can determine a pattern of connection activity based on various factors, including an identification of the wireless access point, the date or time of the day on which the connection takes place, the time spent connected to the access point, whether connections to the same access point are periodically made, and the like. In some aspects of the subject technology, location and update manager 220 may update the determined pattern based on changes to the various factors. In some aspects, location and update manager 220 may update the determined pattern when the mobile device is re-connected to the wireless access point at a different time. Location and update manager 220 can then automatically determine one or more preferred access points based on the pattern of activity. Each wireless access point may be categorized or scored based on these factors, and then the access points having the top scores may be designated as preferred access points. Each wireless access point may further be uniquely identified, for example, by the access point's coordinate location (e.g., GPS coordinates) appended to an associated identification (e.g., SSID).

In aspects of the subject technology, a first indication that the mobile device is communicating with a currently connected wireless access point is received by location and update manager 220. If the currently connected wireless access point is a preferred access point then, in response to receiving the first indication, a second indication that the mobile device is available for software updates using the currently connected wireless access point, is provided by location and update manager 220 to servers 108 via the preferred access point. Otherwise, software updates using the currently connected wireless access point are automatically proscribed by location and update manager 220.

In some aspects of the subject technology, location and update manager 220 may be located at servers 108. Location and update manager 220, when located at servers 108, may receive respective identifications of access points 106a-c when devices 102a-c are connected to one or more of access points 106a-c. As discussed above, location and update manager 220 can determine a pattern of connection activity based on various factors, including an identification of an access point, the date or time of the day on which the connection takes place, the time spent connected to the access point, whether connections to the same access point are periodically made, and the like. Location and update manager 220, when located at servers 108, can then request servers 108 to provide software updates to devices 102a based on the determined pattern of connection activity.

Figure 3:
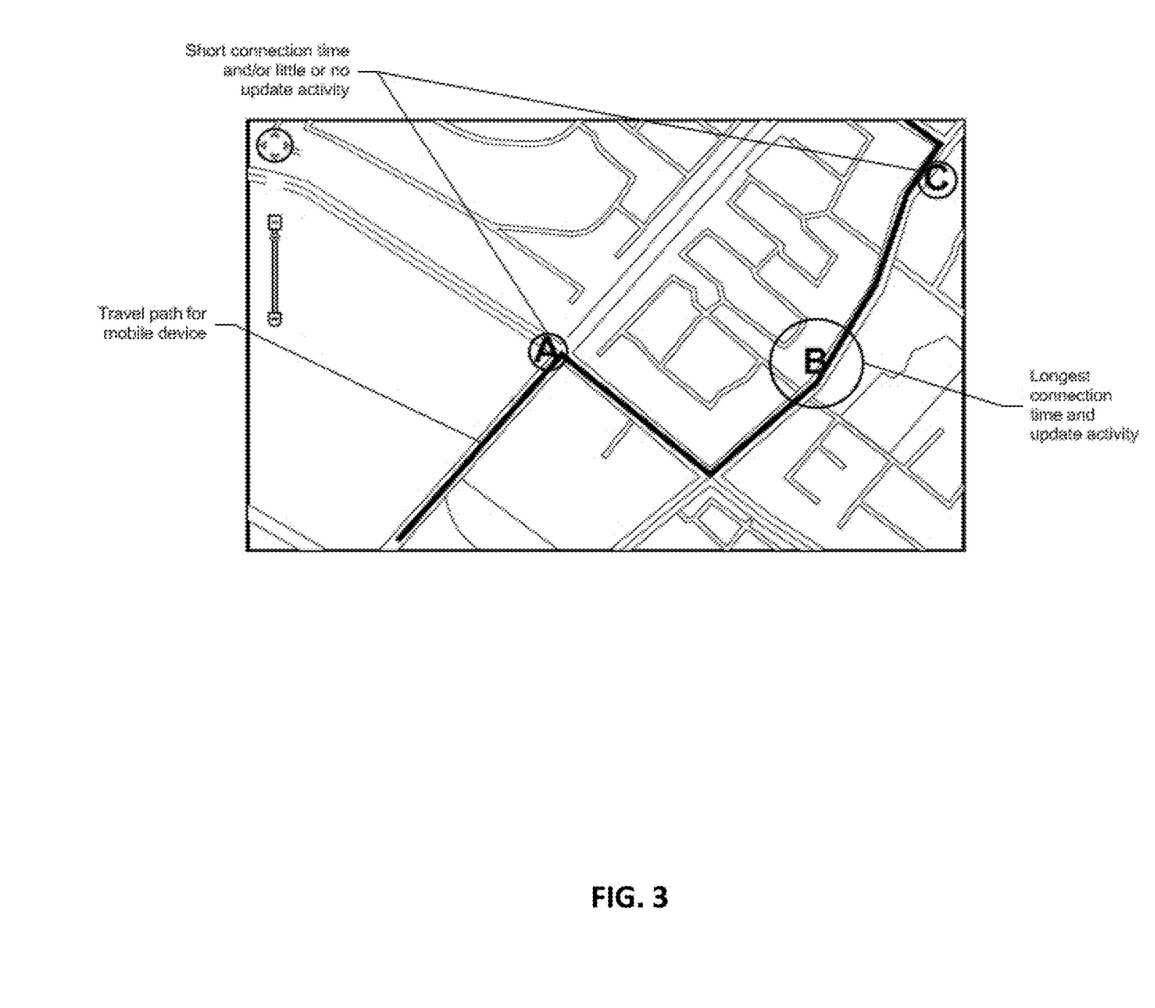
FIG. 3 is an example diagram illustrating a travel path of a mobile device and related update activity according to an aspect of the disclosure.

FIG. 3 is an example diagram illustrating a travel path of a mobile device and related update activity according to an aspect of the disclosure.

As discussed above, a mobile device (e.g., device 102a) is configured to record (e.g., record using location and update manager 220) location information whenever the mobile device is connected to a wireless access point of a local area network. The location information may be recorded in any form of data-structure or database in memory 212 of device 102a. Location information may include a geo-coordinate location of the mobile device received from a mobile device integrated GPS unit at the time the mobile device is connected to the wireless access point and may thus represent a geo-coordinate location (exact or approximate geo-coordinate location) of the wireless access point and its network. The mobile device has recorded the mobile device's geographic coordinates when the mobile device established connections with access points A, B and C. The mobile device may also note when software updates and large downloads (e.g., over 50 Mb) are initiated using the wireless access points A, B and C, and how long the mobile device is connected to each of the wireless access points A, B and C.

As discussed above, the mobile device determines a pattern of connection activity based on various factors, including an identification of the wireless access point, the date or time of the day on which a connection takes place, the time spent connected to the access point, whether connections to the same access point are periodically made, and the like. The mobile device then automatically determines one or more preferred access points based on the pattern of activity. Each wireless access point may be categorized or scored based on these factors, and then the access points having the top scores designated as preferred access points. The scores may be values (e.g., numerical values) that can be stored as a list or any other data-structure in memory 212 of device 102a. In some aspects, one or more wireless access points having scores above a threshold value may be designated as preferred access points. The threshold value may be based on the determined pattern of connection activity. Each wireless access point may further be uniquely identified, for example, by its coordinate location (e.g., GPS coordinates) appended to an associated identification (e.g., SSID). Identifiers (e.g., access point names, SSIDs, etc.) representing the preferred access points may be stored as a list or any other data structure in memory 212 and/or in a memory at servers 108.

With this in mind and referring to FIG. 3, the mobile device (e.g., device 102a) has determined a pattern of connection that includes access points A, B and C. Furthermore, the mobile device has determined access points A and C to be associated with short connection time and/or little connection activity while access point B is determined to correspond to the longest connection time and update activity. As an illustrative example, a short connection time may last a few milliseconds and little connection activity may include transfer of a few bytes of data. On the other hand, and for example, a long connection time may last for several minutes or even hours and long connection activity may include transfer of several bytes or megabytes of data.

The mobile device then proceeds to score the access points A, B and C. In this example scenario, the mobile device may assign a top score to access point B because it corresponds to the longest connection time and update activity and designates access point B as a preferred access point. Lower scores may be assigned to access points A and C because they correspond to short connection time and/or little connection activity. In some aspects of the disclosed subject technology, a threshold score may be determined based on values of connection time and/or connection activity. Scores assigned to one or more access points may be compared with the threshold score. Then, a ranked wireless access point can be determined to be a preferred wireless access point when the assigned score of the ranked wireless access point is greater than the threshold score. In other example aspects, a ranked wireless access point can be determined to be a preferred wireless access point when the assigned score of the ranked wireless access point equal or substantially similar to the threshold score. Any number of access points may be determined to be preferred access points.

In a future or subsequent travel across the path (or approximately similar path) of FIG. 3, when the mobile device connects to a wireless access point (e.g., one of access points A, B, or C), the mobile device determines whether the currently connected access point is a preferred access point. If the currently connected wireless access point is a preferred access point (e.g., access point B) then the mobile device performs software updates from servers 108 via the currently connected wireless access point. Otherwise, the mobile device automatically proscribes software updates using the currently connected wireless access point (e.g., access point A or C). Thus, for example, if location and update manager 220 in the mobile device determines that the device is connected to access point A, which is not a preferred access point, any software updates that are needed by the mobile device may be proscribed until the mobile device connects to wireless access point B, which is a preferred access point.

In some implementations, the pattern of activity, including the previously described location information may be used to determine that a preferred wireless access point is nearby, or to anticipate that the mobile device will enter vicinity of the preferred wireless access point within a predetermined time period. Accordingly, if an update is available for the mobile device, the mobile device may display an indication that the device will perform the update on connecting to the preferred wireless access point. For example, and with reference to FIG. 3, when the mobile device is connected to access point A or in its vicinity, the mobile device can determine that the mobile device may enter the connection range of access point B imminently based on prior travel patterns indicating such connection activity. Such prior travel patterns may be stored at device 102a or servers 108. A connection to access point B may then be used to perform any software updates.

In this way, because aspects of the subject technology can determine appropriate locations having wireless access to update mobile device software, unwanted updates that may be performed over a mobile connection tied to a data plan are avoided. This saves a user mobile data plan bandwidth and can be cost effective for the user. Furthermore, large software updates typically take less time when performed over a wireless connection and interfere less with other network activities initiated by a user, such as web browsing.

Figure 4A:
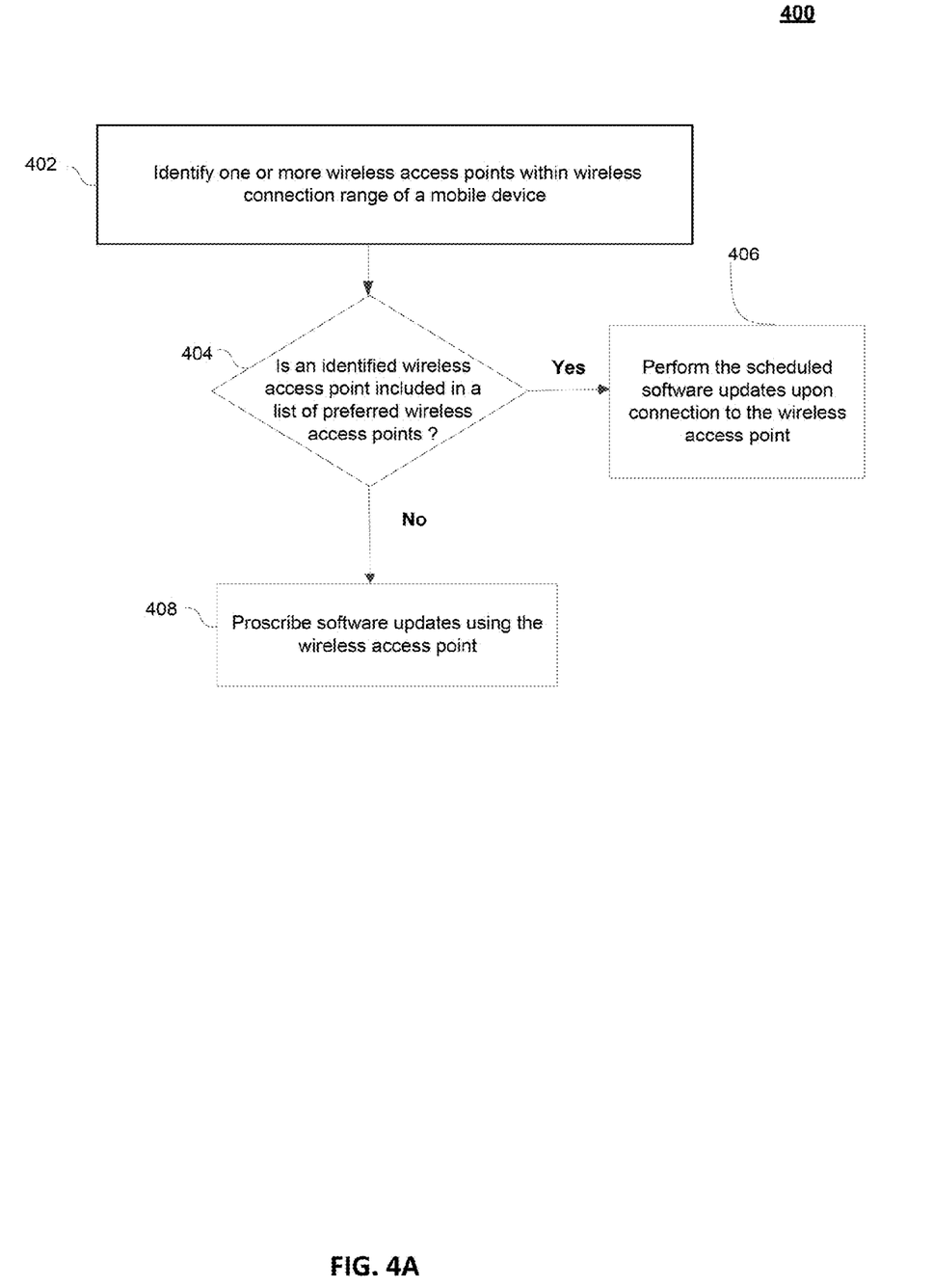
FIGS. 4A and 4B illustrate example processes for practicing implementations of the subject technology using an example device of FIG. 2.

FIG. 4A illustrates an example process 400 for location-based software updates. While FIG. 4A is described with reference to FIG. 2, it should be noted that the process steps of FIG. 4A may be performed by other systems.

The process 400 begins in step 402 with identifying one or more wireless access points within wireless connection range of a mobile device. Next, in step 404, process determines whether a wireless access point of the one or more identified wireless access points of step 402 is included in a list of preferred wireless access points. As an example, the list may be generated with consideration to previous software updates performed via the preferred wireless access points and durations of network connectivity during the previous software updates. The list may be stored, for example, in memory 212 of device 102a. In the list, wireless access points may be identified using their SSIDs, access point names or any other identifier. The SSID (or any other identifier) of the wireless access point may be, for example, compared with other SSIDs on the list to determine whether the wireless access point is included in the list.

If the wireless access point is included in the list of preferred wireless access points, method 400 performs the scheduled software updates upon connection to the wireless access point in step 406. Otherwise the method proceeds to step 408 proscribing software updates using the wireless access point. For example, software updates may be proscribed if the mobile device is connected to access point 106b, but allowed if the mobile device is connected to access point 106c if access point 106c is determined to be included in a list of preferred access points.

Figure 4B:
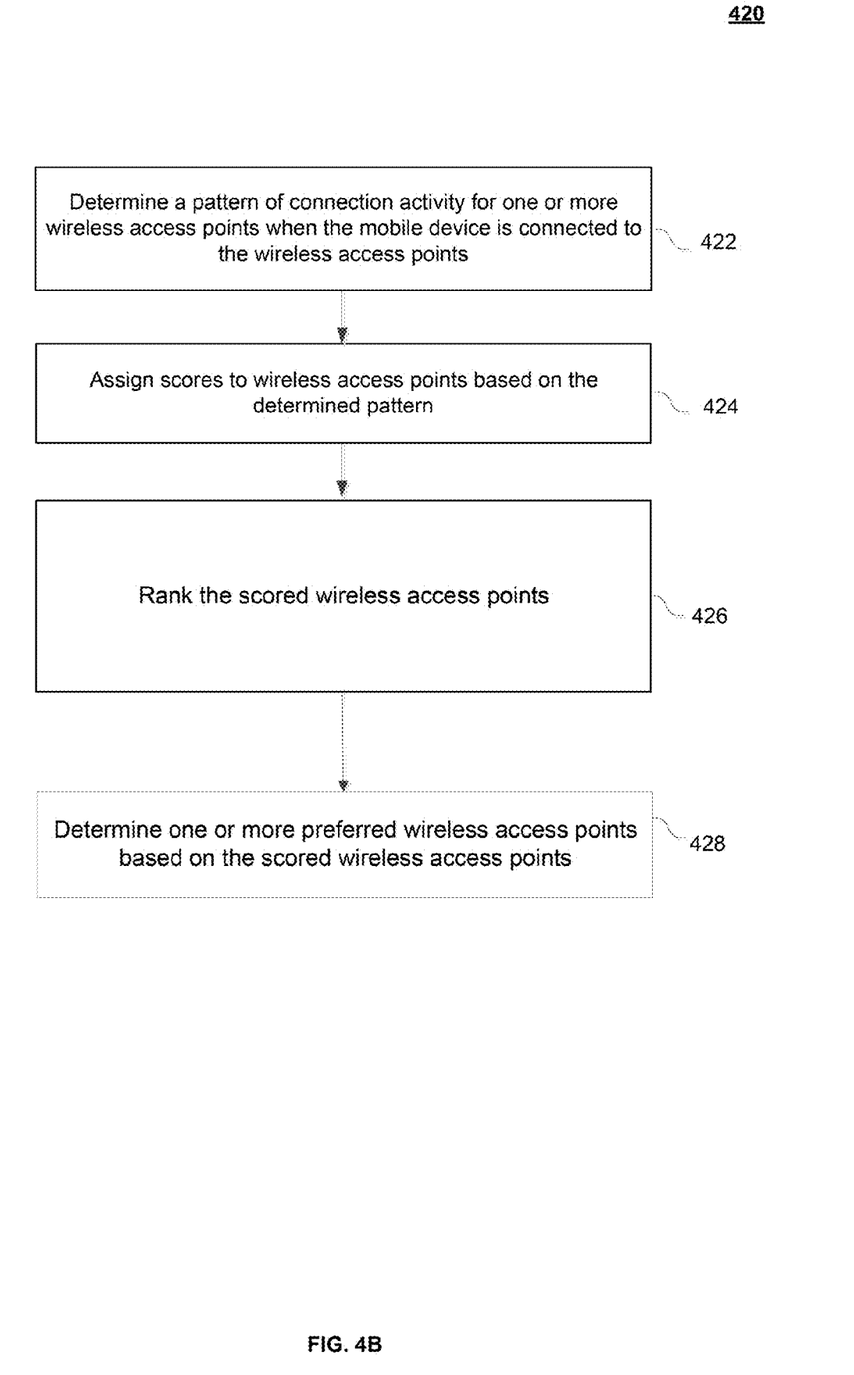

FIG. 4B illustrates another example process 420 for determining preferred WiFi access points. While FIG. 4B is described with reference to FIG. 2, it should be noted that the process steps of FIG. 4 may be performed by other systems.

The process 420 begins with determining a pattern of connection activity for one or more wireless access points in step 422, when the mobile device is connected to one or more wireless access points. For example, mobile device 102a can determine a pattern of connection activity for the wireless access points based on an identification of a wireless access point, a date and time of the day on which a connection takes place, time spent connected to the access point, and whether connections to the same access point are periodically made.

Next, in step 424, scores are assigned to wireless access points using the determined pattern. As an example, mobile device 102a can score the wireless access points based on the identification of a wireless access point, the date and time of the day on which a connection takes place, the time spent connected to the access point, and whether connections to the same access point are periodically made.

Process 420 then proceeds to rank the scored wireless access points in step 426 and determines one or more preferred wireless access points in step 428. For example, a wireless access point with the highest score may be determined to be a preferred access point. In another example, scores assigned to the wireless access points may be compared to a threshold score and a ranked wireless access point may be determined to be a preferred wireless access point when an assigned score of the ranked wireless access point may be greater than the threshold score.

Figure 5:
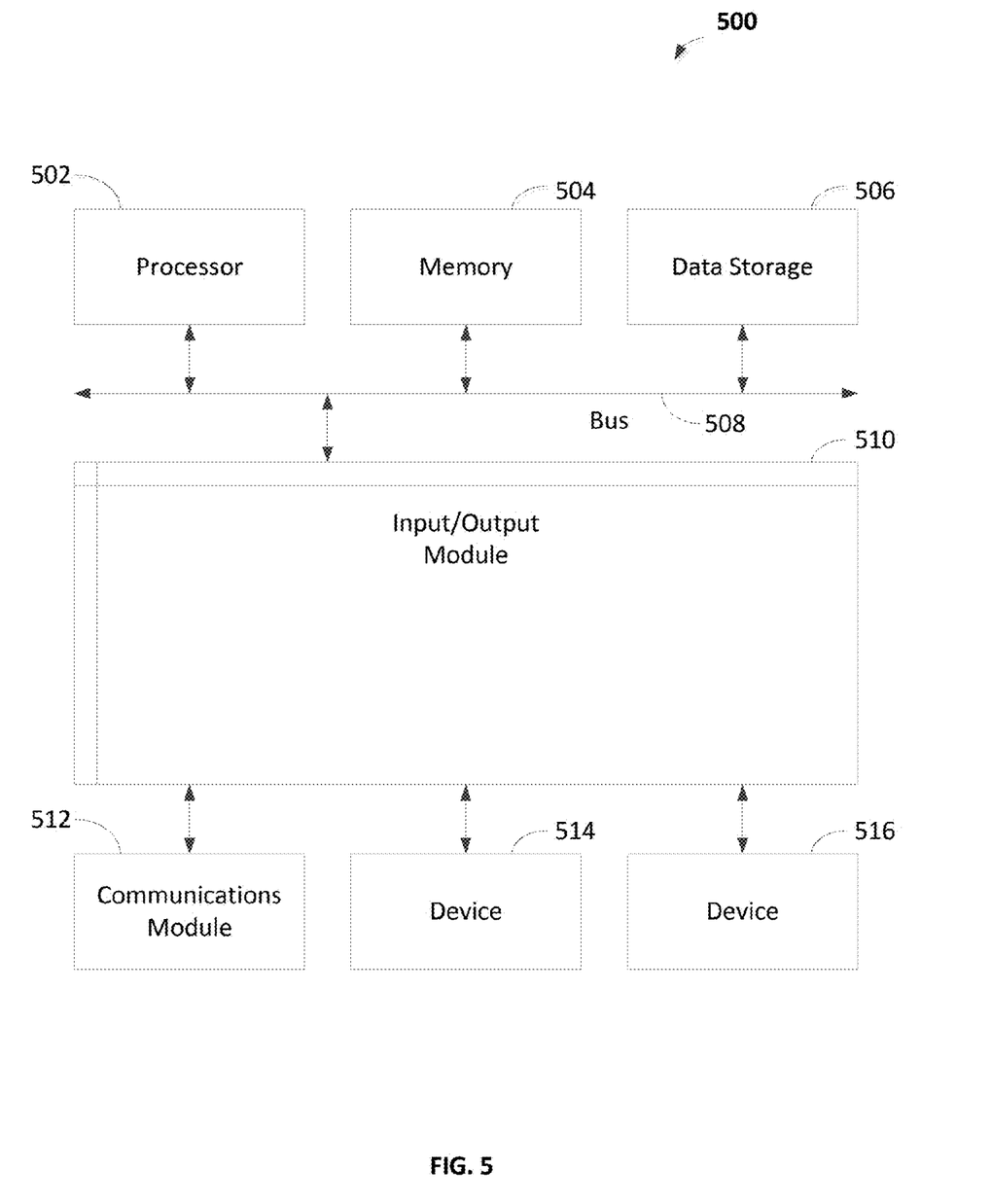
FIG. 5 conceptually illustrates an example electronic system in which some configurations are implemented.

FIG. 5 is a block diagram illustrating an example computer system 500 with which the devices 110a-c can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method comprising:
   identifying one or more wireless access points within wireless connection range of a mobile device;
   determining whether a wireless access point of the one or more identified wireless access points is included in a list of preferred wireless access points, the list generated with consideration to previous software updates performed via the preferred wireless access points and durations of network connectivity during the previous software updates;
   scheduling one or more software updates using the wireless access point, when the wireless access point is included in the list of preferred wireless access points; and
   performing the scheduled software updates upon connection to the wireless access point.

2. The computer-implemented method of claim 1, further comprising:
   receiving a first indication that the mobile device is communicating with the wireless access point; and
   when the wireless access point is included in the list of preferred wireless access points, providing in response to receiving the first indication, a second indication that the mobile device is available for software updates using the wireless access point.

3. The computer-implemented method of claim 1, further comprising:
   providing an indication to a user that the mobile device will perform the one or more software updates on connecting to the wireless access point.

4. The computer-implemented method of claim 1, further comprising:
   determining a pattern of connection activity for the identified wireless access points, wherein the determined pattern is based on connectivity information;
   assigning scores to respective wireless access points in the determined pattern, the scores based on the connectivity information;
   comparing the assigned scores to a threshold score; and
   including a scored wireless access point in the list of the preferred wireless access points when an assigned score of the scored wireless access point is greater than the threshold score.

5. The computer-implemented method of claim 4, the connectivity information further comprising:
   location information including at least a geo-coordinate location of the mobile device at the time the mobile device is connected to the identified wireless access points; and
   software update information including information on when previous software updates are performed via the identified wireless access points and durations of network connectivity during the previous software updates.

6. The computer-implemented method of claim 4, the connectivity information further comprising:
   identifications of the identified wireless access points, dates and times on which connections to the identified wireless access points take place, times spent connected to the identified wireless access points, or an indication of whether connections to the identified wireless access points are periodically made.

7. A non-transitory machine-readable medium comprising instructions stored therein, which when executed by a processor, causes the processor to perform operations comprising:
   identifying one or more wireless access points within wireless connection range of a mobile device;
   determining whether a wireless access point of the one or more wireless access points is included in a list of preferred wireless access points, the list generated with consideration to association of the preferred wireless access points with one or more broadband wireless networks previously used to perform software updates for the mobile device;
   scheduling one or more software updates using the wireless access point, when the wireless access point is included in the list of preferred wireless access points; and
   performing the scheduled software updates upon connection to the wireless access point.

8. The machine-readable medium of claim 7, the operations further comprising:
   receiving a first indication that the mobile device is communicating with the wireless access point; and
   when the wireless access point is included in the list of preferred wireless access points, providing in response to receiving the first indication, a second indication that the mobile device is available for software updates using the wireless access point.

9. The machine-readable medium of claim 7, the operations further comprising:
   providing an indication to a user that the mobile device will perform the one or more software updates on connecting to the wireless access point.

10. The machine-readable medium of claim 7, the operations further comprising:
  storing one or more connectivity parameters for the identified wireless access points, the connectivity parameters including respective geo-coordinate locations of the mobile device at the time the mobile device is connected to the identified wireless access points;
  determining a pattern of connection activity for the identified wireless access points based on the connectivity parameters and the respective geo-coordinate locations of the mobile device; and
  updating the determined pattern based on changes to the connectivity parameters when the mobile device is connected to the identified wireless access points at another time.

11. The machine-readable medium of claim 10, the operations further comprising:
  assigning scores to respective wireless access points in the determined pattern, the scores based on the connectivity parameters;
  comparing the assigned scores to a threshold score; and
  including a scored wireless access point in the list of the preferred wireless access points when an assigned score of the scored wireless access point is greater than the threshold score.

12. The machine-readable medium of claim 10, the connectivity parameters further comprising:
  software update information including information on when previous software updates are performed via the identified wireless access points and durations of network connectivity during the previous software updates.

13. The machine-readable medium of claim 10, the connectivity parameters further comprising:
  identifications of the identified wireless access points, dates and times on which connections to the identified wireless access points take place, times spent connected to the identified wireless access points, or an indication of whether connections to the identified wireless access points are periodically made.

14. The machine-readable medium of claim 10, wherein the wireless access points include WiFi access points.

15. A system for location-based software updates, the system comprising:
  a memory comprising instructions; and
  a processor configured to execute the instructions to:
    identify one or more wireless access points within wireless connection range of a mobile device;
    determine whether a wireless access point of the one or more wireless access points is included in a list of preferred wireless access points;
    schedule one or more software updates using the wireless access point, when the wireless access point is included in the list of preferred wireless access points, the list generated with consideration to association of the preferred wireless access points with one or more geographic locations from where software updates have been previously performed for the mobile device; and
    perform the scheduled software updates upon connection to the wireless access point.

16. The system of claim 15, wherein the processor is further configured to execute instructions to:
  receive a first indication that the mobile device is communicating with the wireless access point; and
  when the wireless access point is included in the list of preferred wireless access points, providing in response to receiving the first indication, a second indication that the mobile device is available for software updates using the identified wireless access point.

17. The system of claim 15, wherein the processor is further configured to execute instructions to:
  provide an indication to a user that the mobile device will perform the one or more software updates on connecting to the wireless access point.

18. A system for location-based software updates, the system comprising:
  memory comprising instructions; and
  a processor configured to execute the instructions to:
    determine a pattern of connection activity for one or more wireless access points, wherein the determined pattern is based on one or more connectivity parameters;
    assign scores to respective wireless access points in the determined pattern, the scores based on the connectivity parameters;
    compare the assigned scores to a threshold score; and
    include a wireless access point in a list of one or more preferred wireless access points when an assigned score of the wireless access point is greater than the threshold score,
    wherein the connectivity parameters include location information and software update information, the location information including at least a geo-coordinate location of a mobile device at the time the mobile device is connected to the one or more wireless access points, the software update information including information on when previous software updates are performed via the one or more wireless access points and durations of network connectivity during the previous software updates.

19. The system of claim 18, wherein the connectivity parameters include: identifications of the wireless access points, dates and times on which connections to the wireless access points take place, times spent connected to the wireless access points, or an indication of whether connections to the wireless access points are periodically made.

* * * * *